(12) United States Patent  
Kim et al.

(10) Patent No.: US 10,777,878 B2  
(45) Date of Patent: Sep. 15, 2020

(54) RADOME AND VEHICULAR RADAR APPARATUS COMPRISING SAME

(71) Applicants: LG INNOTEK CO., LTD., Seoul (KR); INDUSTRY FOUNDATION OF SOGANG UNIVERSITY, Seoul (KR)

(72) Inventors: Cheol Bok Kim, Seoul (KR); Haeng Seon Lee, Seoul (KR); Jeong Hoon Cho, Seoul (KR)

(73) Assignees: LG INNOTEK CO., LTD., Seoul (KR); INDUSTRY FOUNDATION OF SOGANG UNIVERSITY, Seoul (KR)

( * ) Notice: Subject to any disclaimer, the term of this patent is extended or adjusted under 35 U.S.C. 154(b) by 114 days.

(21) Appl. No.: 15/750,755

(22) PCT Filed: Aug. 2, 2016

(86) PCT No.: PCT/KR2016/008529  
§ 371 (c)(1),  
(2) Date: Feb. 6, 2018

(87) PCT Pub. No.: WO2017/023103  
PCT Pub. Date: Feb. 9, 2017

(65) Prior Publication Data  
US 2018/0233812 A1 Aug. 16, 2018

(30) Foreign Application Priority Data

Aug. 6, 2015 (KR) .......................... 10-2015-0111314

(51) Int. Cl.  
*H01Q 1/32* (2006.01)  
*H01Q 1/38* (2006.01)  
(Continued)

(52) U.S. Cl.  
CPC ............. *H01Q 1/3233* (2013.01); *G01S 7/03* (2013.01); *G01S 7/35* (2013.01); *G01S 13/931* (2013.01);  
(Continued)

(58) Field of Classification Search  
CPC .... H01Q 1/3233; H01Q 1/3283; H01Q 1/427; H01Q 1/42; H01Q 1/32; H01Q 1/38;  
(Continued)

(56) References Cited

U.S. PATENT DOCUMENTS

| | | | |
|---|---|---|---|
| 5,652,631 A | 7/1997 | Bullen et al. | |
| 5,973,647 A * | 10/1999 | Barrett | H01Q 21/068 333/137 |
| 7,391,381 B2 * | 6/2008 | Wang | G01S 3/14 342/375 |
| 8,081,118 B2 * | 12/2011 | McCarthy | H01Q 1/02 29/600 |

(Continued)

FOREIGN PATENT DOCUMENTS

| | | |
|---|---|---|
| JP | 2005-203978 A | 7/2005 |
| JP | 2007-235287 A | 9/2007 |

(Continued)

OTHER PUBLICATIONS

International Search Report issued in PCT/KR2016/008529 (PCT/ISA/210), dated Nov. 22, 2016.

*Primary Examiner* — Trinh V Dinh  
(74) *Attorney, Agent, or Firm* — Birch, Stewart, Kolasch & Birch, LLP

(57) ABSTRACT

According to an embodiment of the present invention, there is provided a radome, including a cover part configured to cover a printed circuit board (PCB) on which a plurality of antenna arrays and an integrated circuit (IC) chip connected to the plurality of antenna arrays are formed, and a plurality of projection parts on an inner side of the cover part opposite to the PCB.

18 Claims, 12 Drawing Sheets

(51) Int. Cl.
*G01S 7/03* (2006.01)
*H01Q 1/42* (2006.01)
*G01S 7/35* (2006.01)
*G01S 13/931* (2020.01)
*G01S 7/02* (2006.01)

(52) U.S. Cl.
CPC ............. *H01Q 1/32* (2013.01); *H01Q 1/3283* (2013.01); *H01Q 1/38* (2013.01); *H01Q 1/42* (2013.01); *H01Q 1/427* (2013.01); *G01S 2007/027* (2013.01); *G01S 2013/9315* (2020.01); *G01S 2013/93272* (2020.01); *G01S 2013/93274* (2020.01)

(58) Field of Classification Search
CPC . G01S 7/35; G01S 13/931; G01S 7/03; G01S 2007/027; G01S 2013/9378; G01S 2013/9332; G01S 2013/9385
See application file for complete search history.

(56) References Cited

U.S. PATENT DOCUMENTS

| | | | |
|---|---|---|---|
| 8,259,032 B1* | 9/2012 | Buckley | H01Q 1/40 |
| | | | 343/873 |
| 2002/0067314 A1 | 6/2002 | Takimoto et al. | |
| 2007/0241962 A1 | 10/2007 | Shinoda et al. | |
| 2010/0309089 A1* | 12/2010 | Collinson | H01Q 1/42 |
| | | | 343/872 |
| 2017/0054204 A1* | 2/2017 | Changalvala | H01Q 1/3291 |
| 2017/0307724 A1* | 10/2017 | Park | G01S 7/03 |
| 2018/0233812 A1* | 8/2018 | Kim | G01S 7/03 |

FOREIGN PATENT DOCUMENTS

| | | |
|---|---|---|
| JP | 2008-58130 A | 3/2008 |
| KR | 10-2002-0025049 A | 4/2002 |
| KR | 10-2002-0094802 A | 12/2002 |
| WO | WO 2005/055366 A1 | 6/2005 |

* cited by examiner

【Fig. 1】
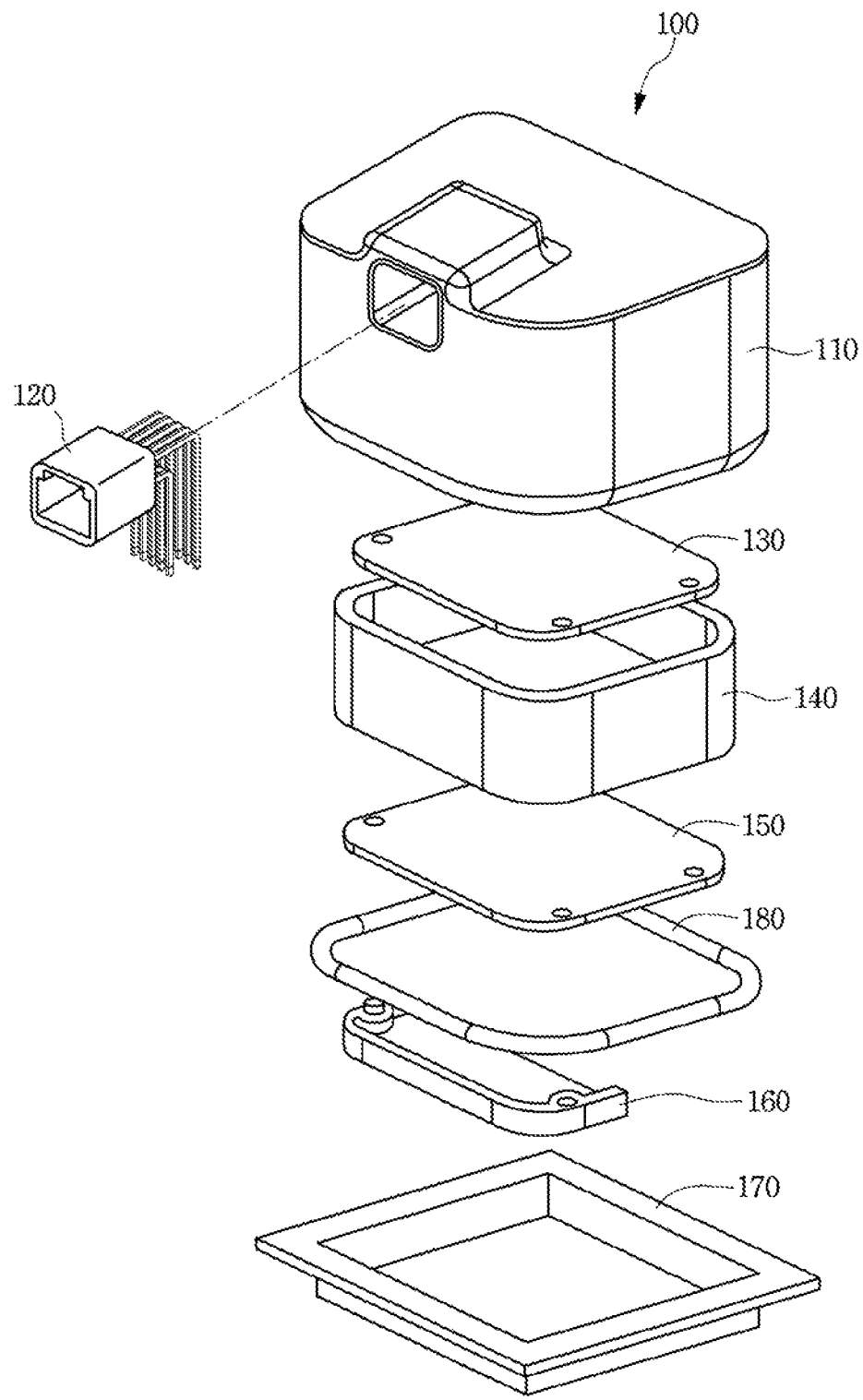

[Fig. 2]
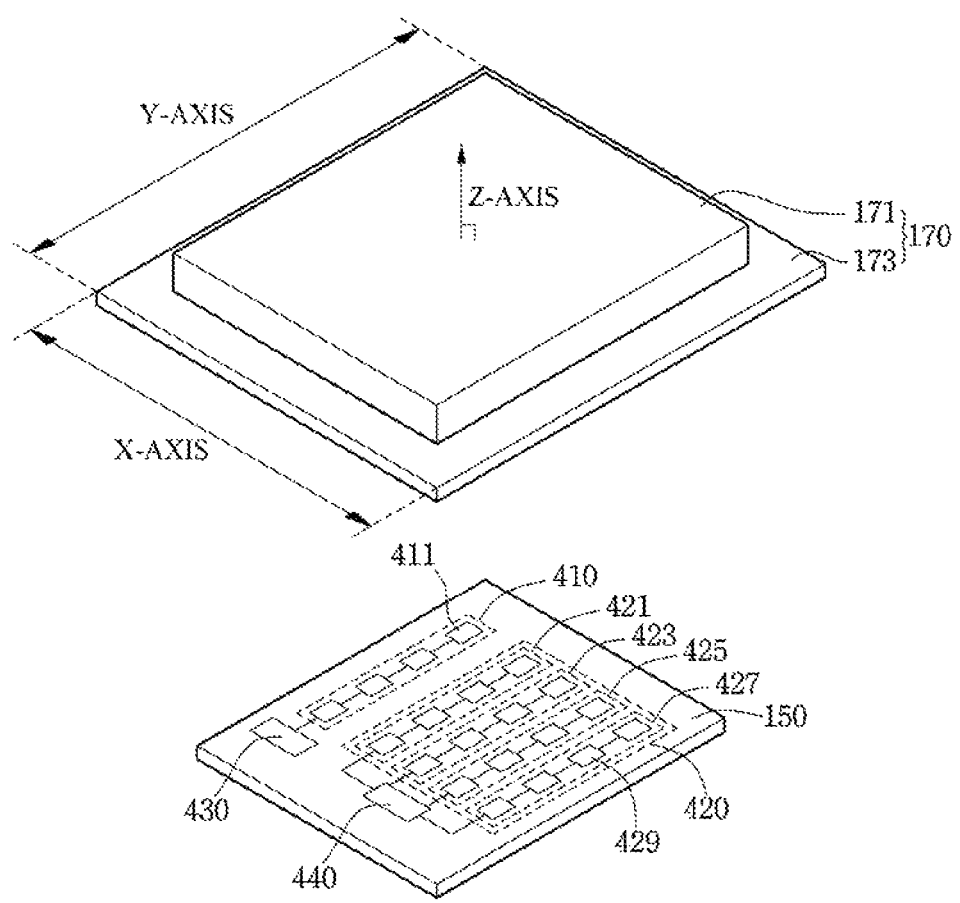

[Fig. 3]
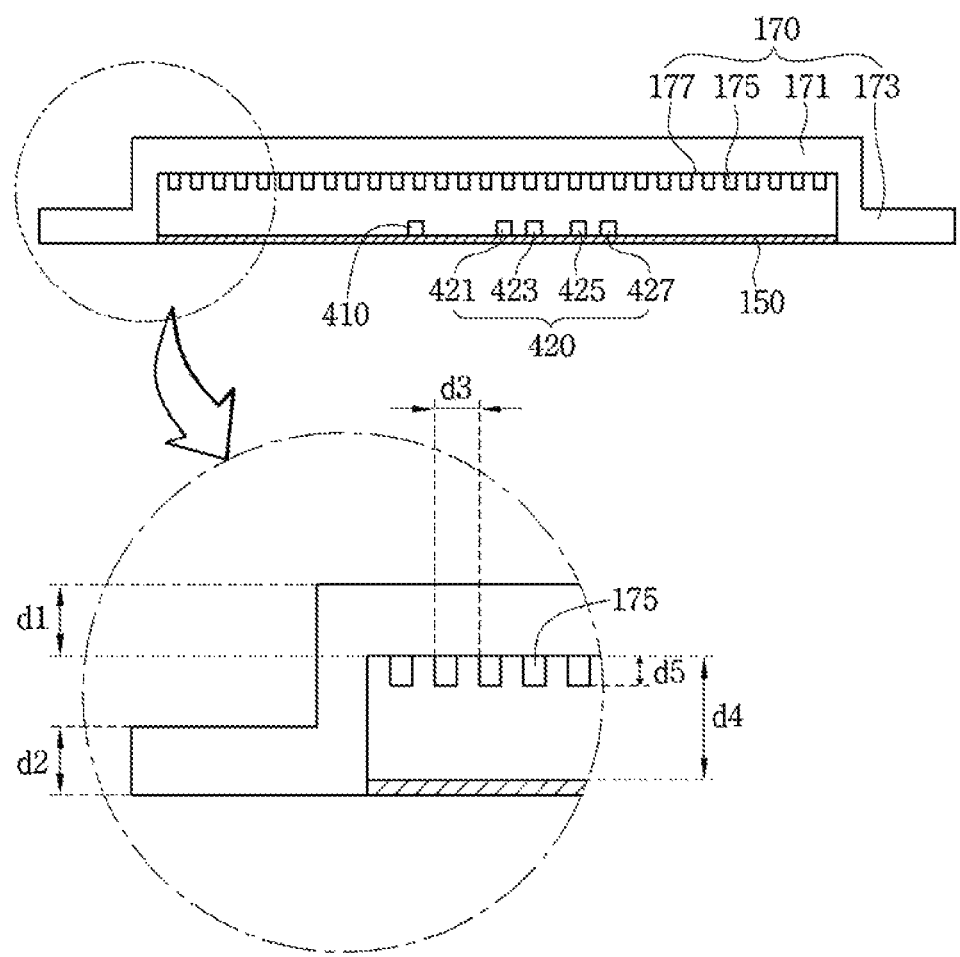

[Fig. 4]
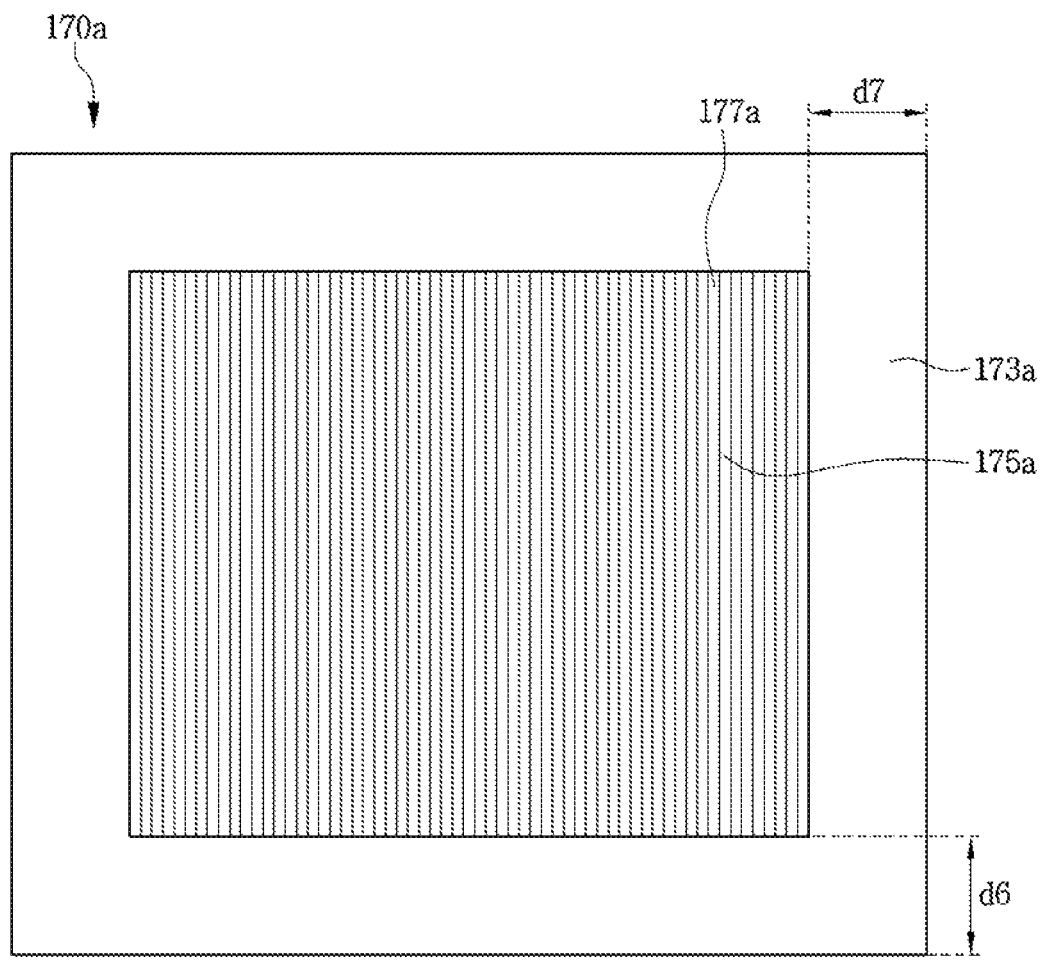

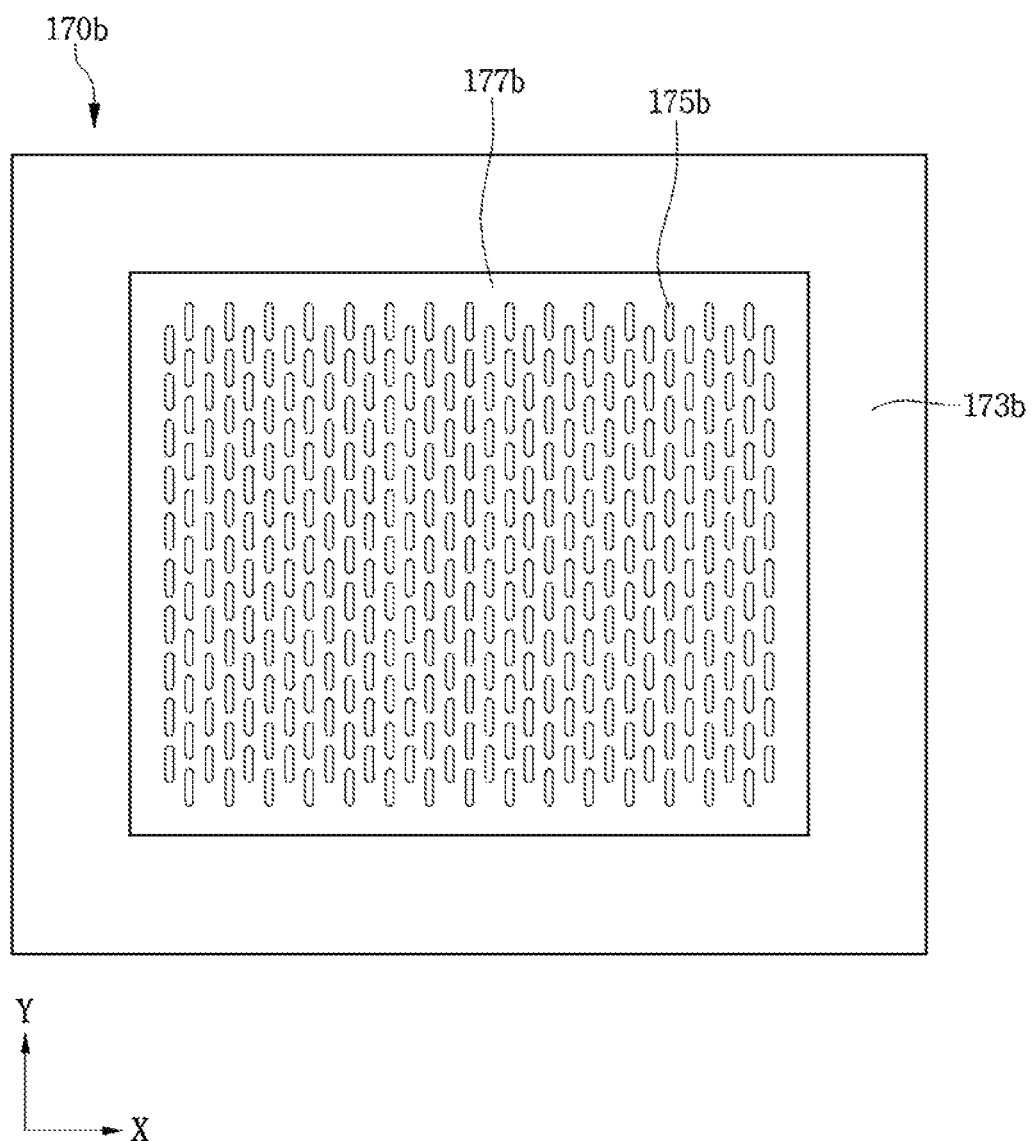
[Fig. 5]

[Fig. 6]
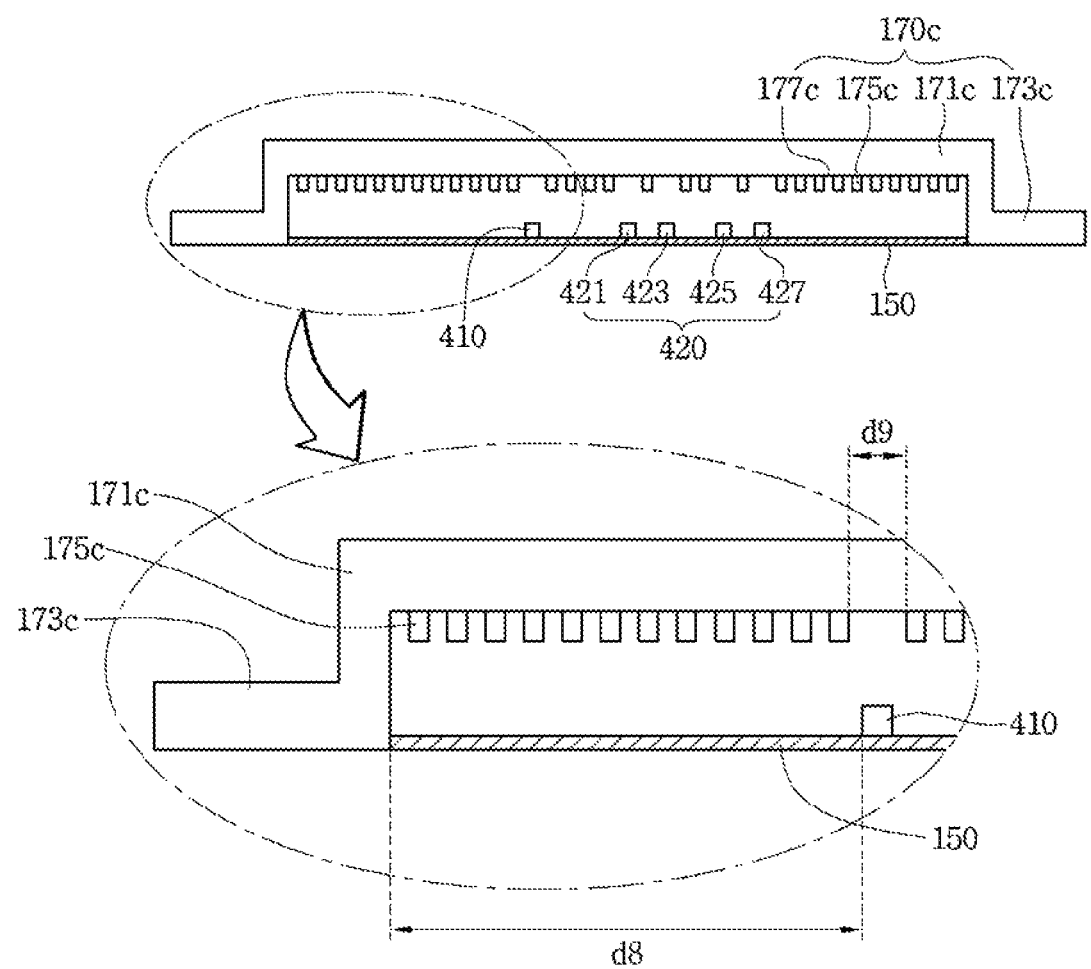

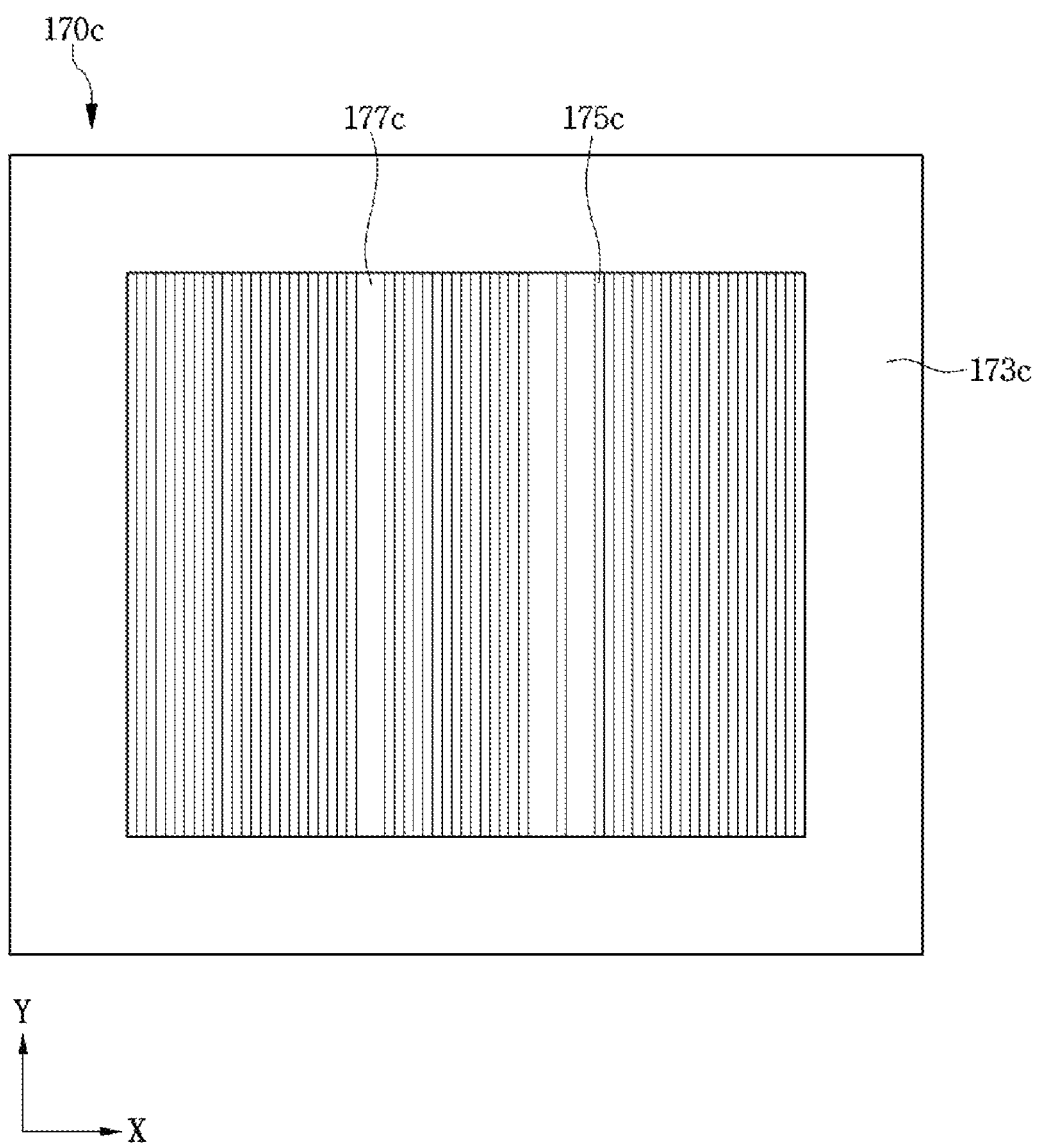
[Fig. 7]

[Fig. 8]
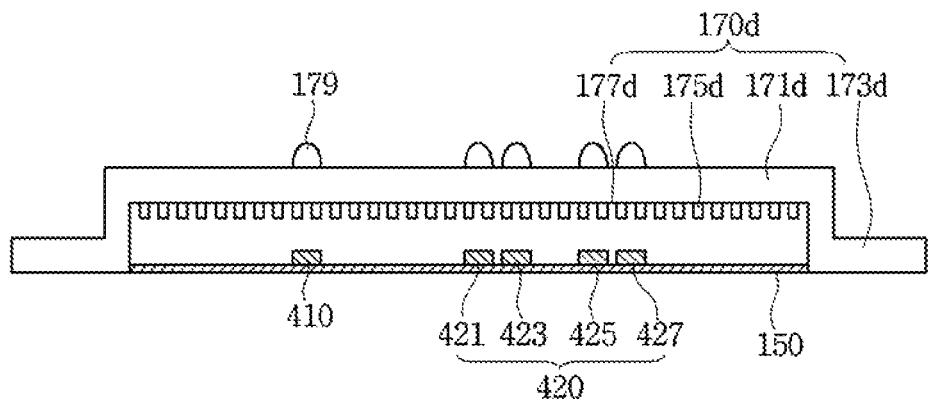
[Fig. 9]
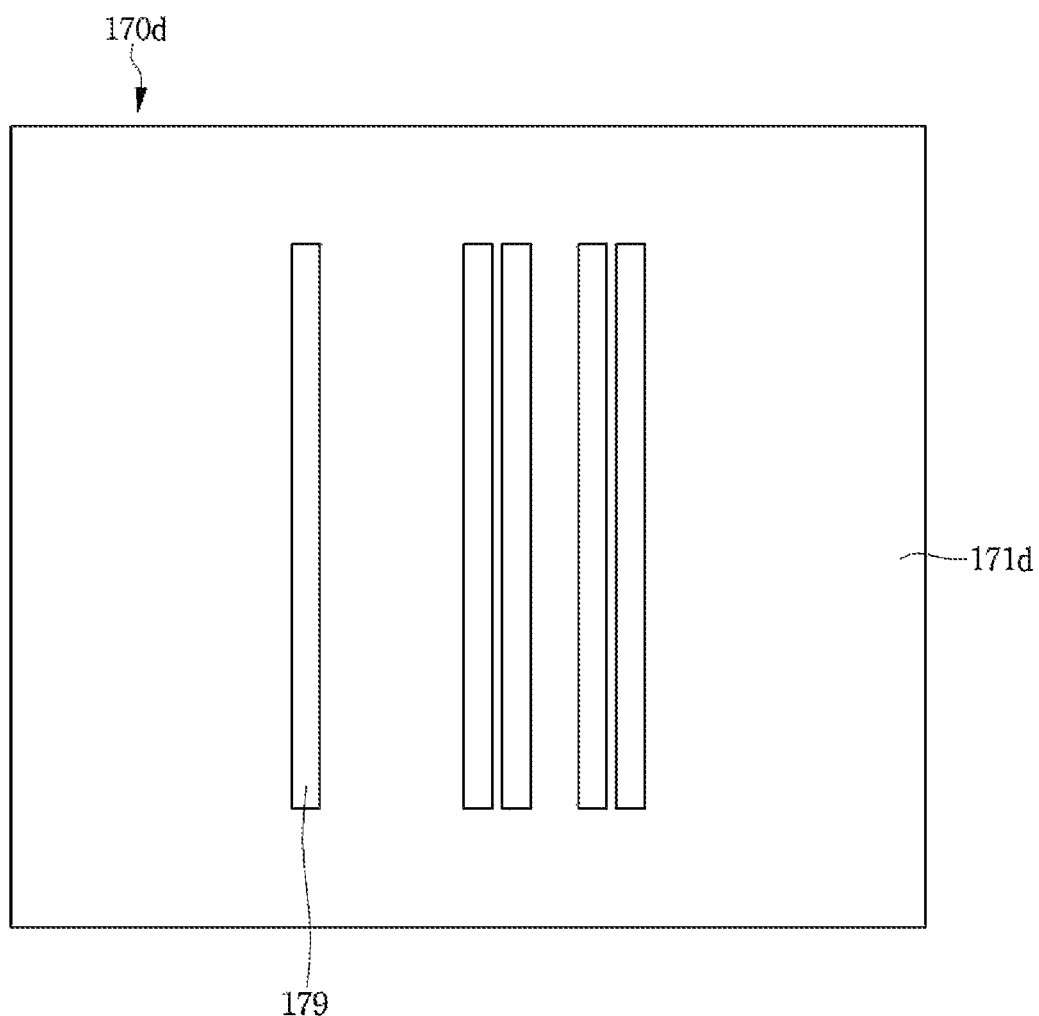

[Fig. 10]
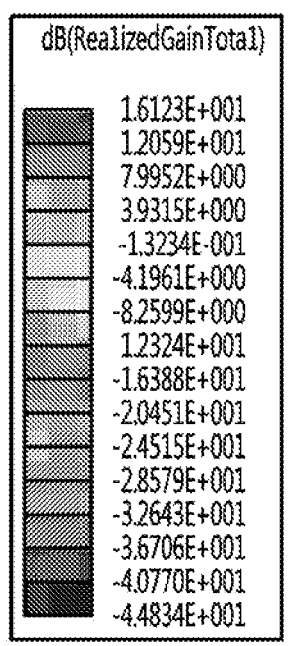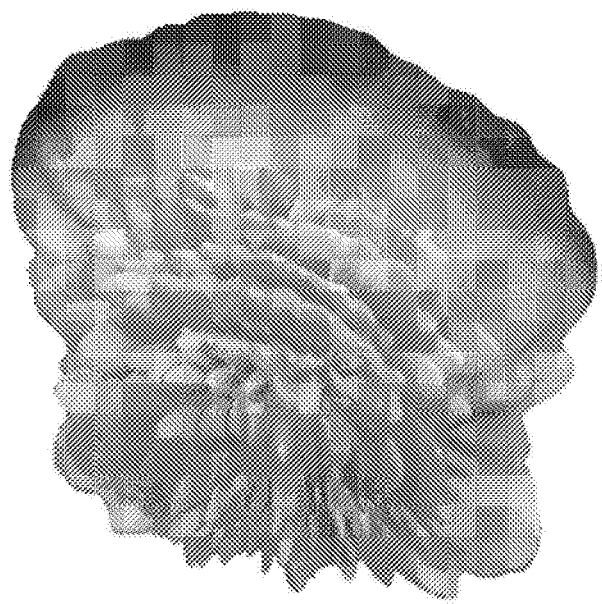
(a)
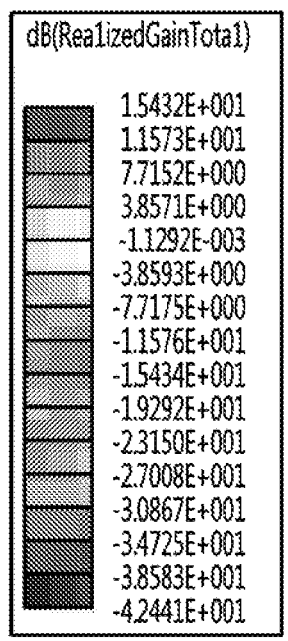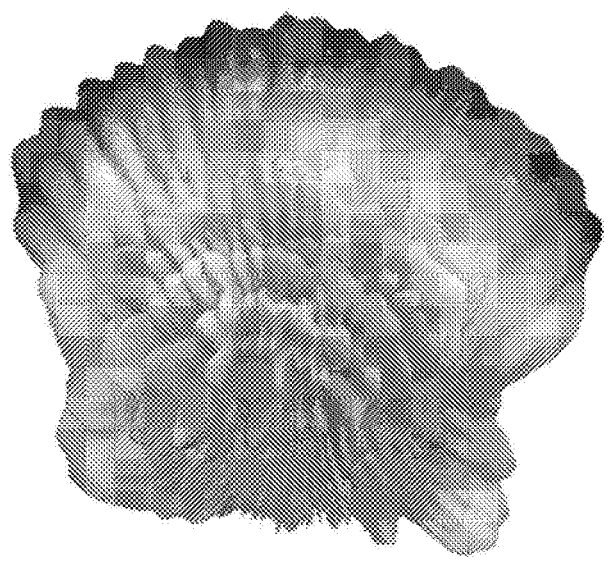
(b)

[Fig. 11]
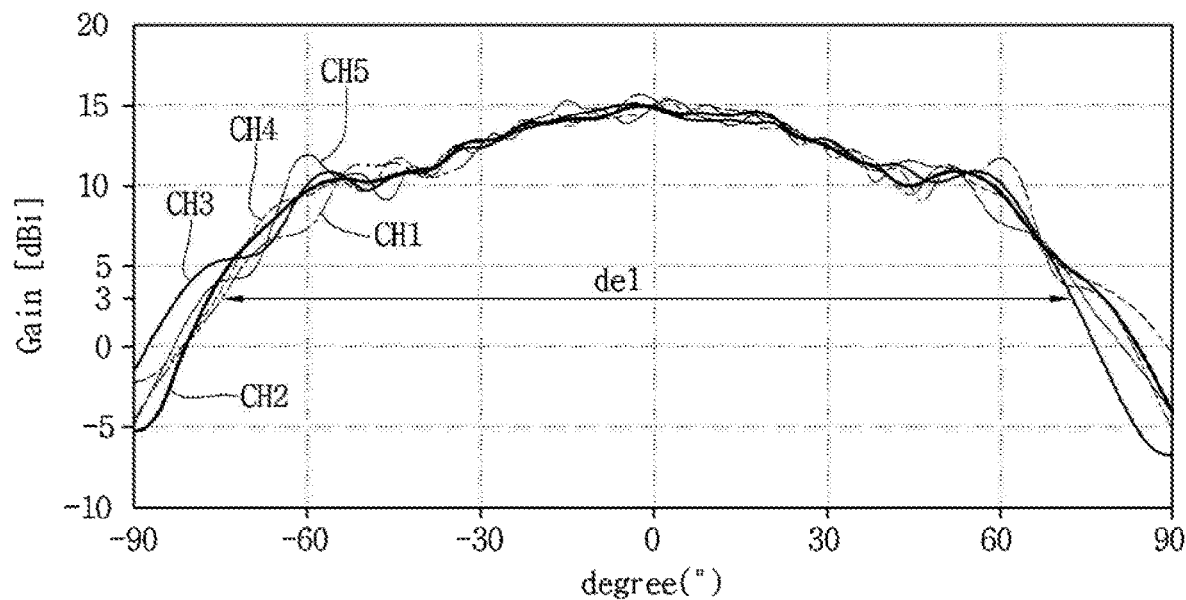
[Fig. 12]
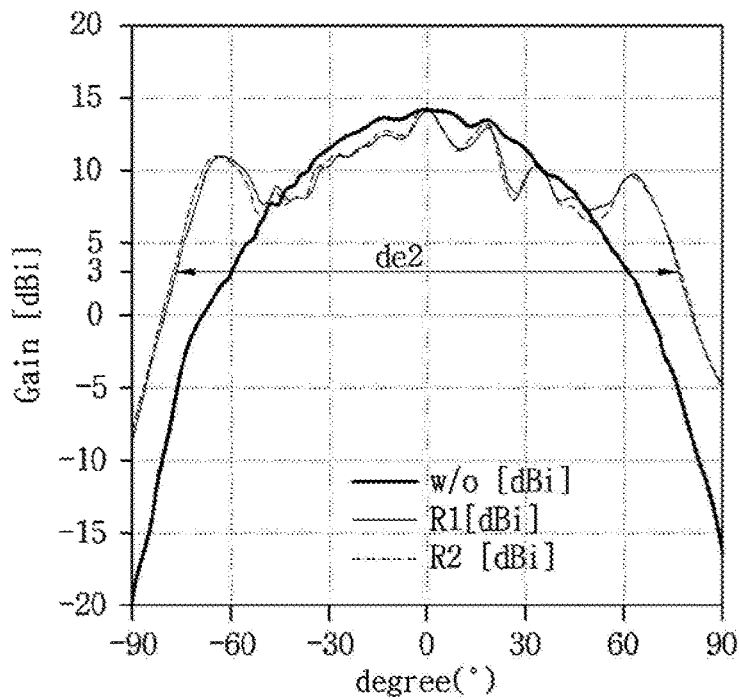

【Fig. 13】
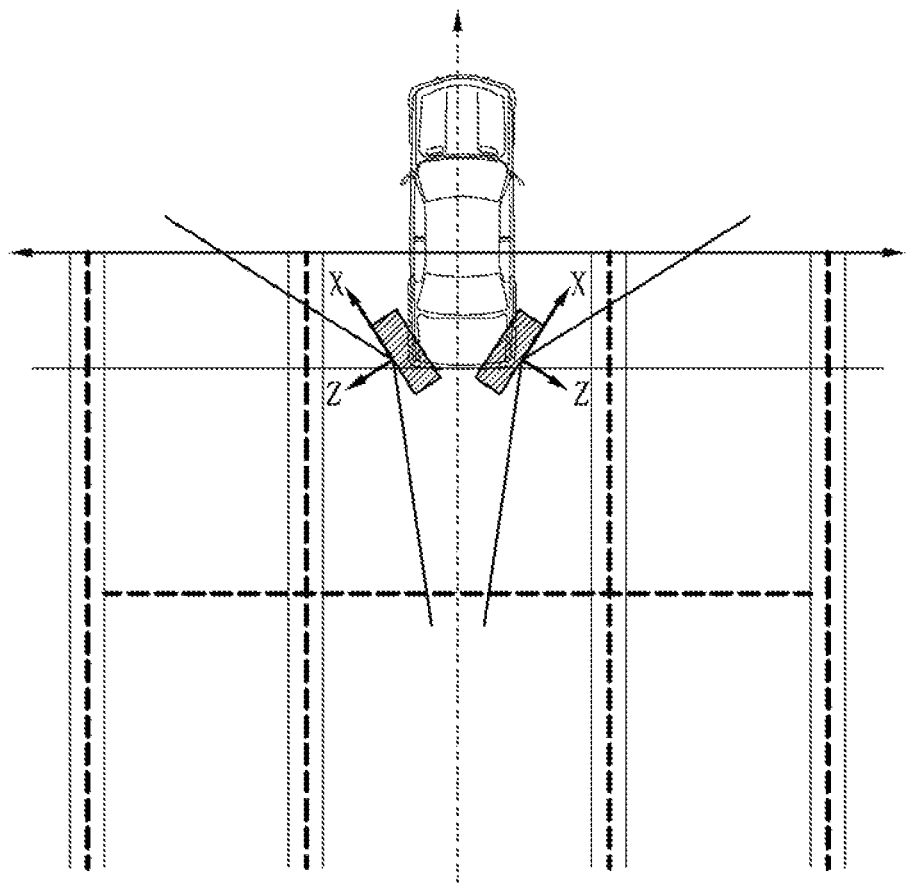
【Fig. 14】
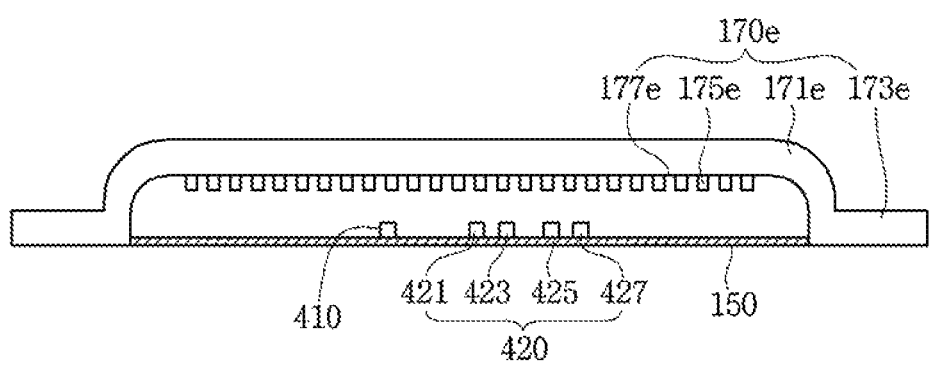

【Fig. 15】
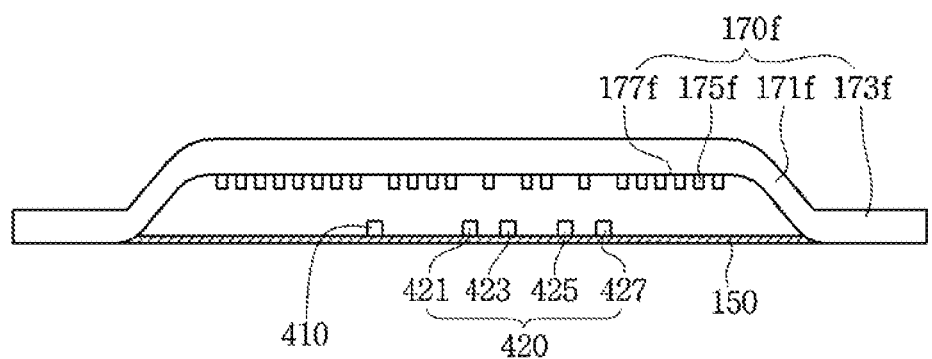

RADOME AND VEHICULAR RADAR APPARATUS COMPRISING SAME

CROSS REFERENCE TO RELATED APPLICATIONS

This application is the National Phase of PCT International Application No. PCT/KR2016/008529, filed on Aug. 2, 2016, which claims priority under 35 U.S.C. 119(a) to Patent Application No. 10-2015-0111314, filed in the Republic of Korea on Aug. 6, 2015, all of which are hereby expressly incorporated by reference into the present application.

TECHNICAL FIELD

The present invention relates to a radome and a vehicular radar apparatus including the same, and more particularly to a vehicular radar apparatus including a projection on one surface of a radome, and a radome.

BACKGROUND ART

With development of millimeter-wave wireless communication technology and interest in automotive safety technology, demand for a vehicular radar technology is increasing rapidly. A vehicular radar apparatus is mounted on an outer side of a vehicle, and may detect or track a distance, speed, and angle of a target apparatus through radio wave transmission and reception. Nowadays, radar of a frequency modulated continuous wave (FMCW) method, which may be implemented with a relatively simple circuit configuration and a low radio wave output in 24 GHz or 77 GHz band, has been adopted as a vehicular radar apparatus so that a vehicle having functions of front detection, side and rear detection, and an automatic cruise control has been developed.

In components constituting a reliable vehicular radar apparatus, an array antenna is a core component functioning to transmit and receive a radar wave, and has a phase array antenna structure in order to distinguish relative positions and speeds of an obstacle and a vehicle. For the front detection and automatic cruise control, an antenna is used which divides and detects an angular area of a narrow range very precisely, and for the side and rear detection, an antenna is required which is divides and detects an angular area of wide range.

Meanwhile, a vehicular radar apparatus includes an antenna configured to transmit and receive radio waves, internal electronic components such as a millimeter-wave radio frequency integrated circuit (RFIC), and a radome configured to protect the same. The radome mechanically protects internal electronic components of a vehicular radar apparatus from external environment, and functions to minimize loss of radio waves transmitted to outside or received from the outside.

Since a vehicular radar apparatus installed on a rear side of a vehicle is necessary to detect a side and rear of a vehicle, which are not seen by a side mirror, the vehicular radar apparatus is required to have a very wide detection angle of field of view (FOV) of 150 degrees or more. For this, there is an attempt to use a wide-angle antenna having a wide beam width, but it is difficult to obtain a detection angle of the FOV of 150 degrees or more with the wide-angle antenna only.

DISCLOSURE

Technical Problem

The present invention is directed to providing a radome including a projection on one surface thereof for detecting a wide area and a vehicular radar apparatus including the same.

Technical Solution

One aspect of the present invention provides a radome, including a cover part configured to cover a printed circuit board (PCB) on which a plurality of antenna arrays and an integrated circuit (IC) chip connected to the plurality of antenna arrays are formed, and a plurality of projection parts on an inner side of the cover part opposite to the PCB.

Another aspect of the present invention provides a vehicular radar apparatus, including a case, a PCB which is accommodated in the case and in which a plurality of antenna arrays and an IC chip connected to the plurality of antenna arrays are disposed, and a radome coupled to the case and configured to cover the PCB, wherein the radome includes a plurality of projection parts on an inner side of a cover part opposite to the PCB.

Advantageous Effects

According to an embodiment of the present invention, a vehicular radar can detect a wide area by improving a beam width via changing a radome structure.

In addition, since a projection may be included on an inner side surface of a radome, radio waves transmitting in a surface direction due to irregular reflection can be suppressed, and radio wave transmission can be increased in a vertical direction.

Further, since a lens-shaped projection may be included on an outer side surface of a radome, a beam width can be improved.

DESCRIPTION OF DRAWINGS

FIG. 1 is an exploded perspective view of a vehicular radar apparatus according to an embodiment of the present invention.

FIG. 2 is a perspective view illustrating a radome and a printed circuit board (PCB) of a vehicular radar apparatus according to an embodiment of the present invention.

FIG. 3 is a cross-sectional view illustrating a radome and a PCB of a vehicular radar apparatus according to a first embodiment of the present invention.

FIG. 4 is a plan view of a radome of a vehicular radar apparatus according to a first embodiment of the present invention.

FIG. 5 is a plan view of a radome of a vehicular radar apparatus according to a second embodiment of the present invention.

FIG. 6 is a cross-sectional view illustrating a radome and a PCB of a vehicular radar apparatus according to a third embodiment of the present invention.

FIG. 7 is a plan view of a radome of a vehicular radar apparatus according to a third embodiment of the present invention.

FIG. 8 is a cross-sectional view illustrating a radome and a PCB of a vehicular radar apparatus according to a fourth embodiment of the present invention.

FIG. 9 is a plan view of a radome of a vehicular radar apparatus according to a fourth embodiment of the present invention.

FIG. 10 is a 3D radiation pattern diagram of vehicular radar apparatuses according to first and third embodiments of the present invention.

FIG. 11 is a is a 2D radiation pattern diagram of a vehicular radar apparatus according to a first embodiment of the present invention.

FIG. 12 is a is a 2D radiation pattern diagram of a vehicular radar apparatus according to an embodiment of the present invention.

FIG. 13 is a plan view illustrating a vehicular radar apparatus mounted on a side and rear side of a vehicle according to an embodiment of the present invention.

FIG. 14 is a plan view of a radome of a vehicular radar apparatus according to a fifth embodiment of the present invention.

FIG. 15 is a plan view of a radome of a vehicular radar apparatus according to a sixth embodiment of the present invention.

MODES OF THE INVENTION

Hereinafter, exemplary embodiments of the present invention will be described in detail with reference to the accompanying drawings, wherein like reference numerals are used to designate identical or similar elements, and redundant description thereof will be omitted. The suffix "module" and "portion" of the components used in the following description are only given or mixed in consideration of ease of preparation of the description, and there is no meaning or role to be distinguished as it is from one another. Also, in the following description of the embodiments of the present invention, a detailed description of related arts will be omitted when it is determined that the gist of the embodiments disclosed herein may be obscured. Also, the accompanying drawings are included to provide a further understanding of the invention, are incorporated in, and constitute a part of this description, and it should be understood that the invention is intended to cover all modifications, equivalents, or alternatives falling within the spirit and scope of the invention.

Terms including ordinals, such as first, second, etc., may be used to describe various components, but the elements are not limited to these terms. The terms are used only for distinguishing one component from another.

When a component is referred to as being "connected" or "joined" to another component, it may be directly connected or joined to the other component, but it should be understood that other component may be present therebetween. When a component is referred to as being "directly connected" or "directly joined" to another component, it should be understood that other component may not be present therebetween.

A singular representation includes plural representations, unless the context clearly implies otherwise.

In the present application, terms such as "including" or "having" are used to specify the presence of features, numbers, steps, operations, components, parts, or combinations thereof described in the description. However, it should be understood that the terms do not preclude the presence or addition of one or more other features, numbers, steps, operations, components, parts, or combinations thereof.

A vehicle described in the present invention may be a concept including an automobile, or a motorcycle. Hereinafter, an automobile will be mainly described in terms of a vehicle.

The vehicle described in the present invention may be a concept including all of an internal combustion engine vehicle having an engine as a power source, a hybrid vehicle having an engine and an electric motor as a power source, and an electric vehicle having an electric motor as a power source.

In the following description, a left side of a vehicle refers to a left side in a traveling direction of the vehicle, and a right side of the vehicle refers to a right side in the traveling direction of the vehicle.

FIG. 1 is an exploded perspective view of a vehicular radar apparatus according to an embodiment of the present invention.

Referring to FIG. 1, a vehicular radar apparatus 100 may include a case 110, a connector 120, an auxiliary printed circuit board (PCB) 130, a bracket 140, a PCB 150, a shield part 160, a radome 170, and a waterproof ring 180.

The case 110 may accommodate the connector 120, the auxiliary PCB 130, the bracket 140, the PCB 150, and the shield part 160.

The connector 120 may transmit and receive signals between the vehicular radar apparatus 100 and an external apparatus. For example, the connector 120 may be a controller area network (CAN) connector, but is not limited thereto.

A circuit for power supply and signal processing may be mounted on the auxiliary PCB 130, but is not limited thereto.

The bracket 140 may block noise generated during signal processing of the auxiliary PCB 130.

A plurality of antenna arrays and an integrated circuit (IC) chip connected to the plurality of antenna arrays may be mounted on the PCB 150. The plurality of antenna arrays may include a plurality of wide-angle antennas arranged in a row, but is not limited thereto. The IC chip may be a millimeter-wave radio frequency IC (RFIC), but is not limited thereto.

According to an embodiment, the plurality of antenna arrays and the IC chip connected to the plurality of antenna arrays may be mounted on the auxiliary PCB 130. The auxiliary PCB 130 and the PCB 150 may be disposed spaced apart from each other with the bracket 140 therebetween.

The shield part 160 may shield a RF signal generated from the IC chip of the PCB 150. For this, the shield part 160 may be formed in an area corresponding to the IC chip of the PCB 150.

The radome 170 may accommodate the PCB 150 to protect the PCB 150 and the radome 170 may be fastened to the case 110. The radome 170 may be made of a material with low attenuation of radio waves and may be an electric insulator.

The waterproof ring 180 is disposed between the radome 170 and the case 110 to prevent the vehicular radar apparatus 100 from being inundated with water. For example, the waterproof ring 180 may be made of an elastic material.

FIG. 2 is a perspective view illustrating a radome and a PCB of a vehicular radar apparatus according to an embodiment of the present invention.

Referring to FIG. 2, the PCB 150 may include a plurality of antenna arrays and IC chips 430 and 440.

The plurality of antenna arrays may include a transmitting antenna part 410 and a receiving antenna part 420 on the PCB 150.

The transmitting antenna part 410 may include a radiator 411, and the radiator 411 may radiate a signal from the transmitting antenna part 410. That is, the radiator 411 may form a radiation pattern of the transmitting antenna part 410. Here, the radiator 411 may be arranged along a feeder line, and the radiator 411 may be made of a conductive material. Here, the radiator 411 may include at least one of silver (Ag), palladium (Pd), platinum (Pt), copper (Cu), gold (Au), and nickel (Ni).

The receiving antenna part 420 may include a plurality of receiving antenna arrays 421, 423, 425, and 427, and may include a radiator 429. The radiator 429 may form a radiation pattern of the receiving antenna part 420. Here, the radiator 429 may be arranged along a feeder line, and the radiator 429 may be made of a conductive material. Here, the radiator 429 may include at least one of Ag, Pd, Pt, Cu, Au, and Ni.

The IC chips 430 and 440 may be connected to the plurality of antenna arrays. For example, the IC chips 430 and 440 may include a millimeter wave RFIC. The IC chips 430 and 440 generate transmitting signals from transmitting data to output to the transmitting antenna part 410, may receive signals from the receiving antenna part 420, and may generate data from reception signals.

The radome 170 may include a cover part 171 disposed opposite to the PCB 150 and an edge part 173 fastened to the case 110. The PCB 150 may be disposed in a space formed by a height difference between the cover part 171 and the edge part 173 of the radome 170.

In the radome 170, a direction in which the plurality of antenna arrays are disposed sequentially may be defined as a Y-axis direction, a direction perpendicular to the direction in which the plurality of antenna arrays are sequentially arranged may be defined as a Y-axis direction, and a vertical direction with respect to the plurality of antenna arrays may be defined as a Z-axis direction.

FIG. 3 is a cross-sectional view illustrating a radome and a PCB of a vehicular radar apparatus according to a first embodiment of the present invention.

Referring to FIG. 3, a radome 170 may include a cover part 171 disposed opposite to a PCB 150, an edge part 173 configured to be fastened to a case 110, and a projection part 175 disposed on an inner side surface 177 of the cover part 171.

The cover part 171 may accommodate the PCB 150 in order to protect the PCB 150, and may pass radio waves radiated from antenna parts 410 and 420 mounted on the PCB 150 and radio waves received from outside.

The PCB 150 may be disposed in a space formed by a height difference between the cover part 171 and the edge part 173 of the radome 170. A transmitting antenna part 410 and a receiving antenna part 420 may be mounted on the PCB 150, and the receiving antenna part 420 may include a plurality of receiving antenna arrays 421, 423, 425, and 427.

Referring to enlarged views of the radome 170 and the PCB 150, a height d1 of the cover part 171 of the radome 170 may be equal to a height d2 of the edge part 173, but is not limited thereto. For example, the height d1 of the cover part 171 may be 1 mm or more and 2 mm or less, and the height d2 of the edge part 173 may be 1 mm or more and 2 mm or less, but is not limited thereto.

The projection part 175 may include a plurality of projections, and a shape of the projection may be a rectangular shape, but is not limited thereto. An interval d3 between the plurality of projections may be 1 mm, but is not limited thereto.

A distance d4 between the inner side surface 177 of the cover part 171 and the PCB 150 may be 1 mm or more and 3 mm or less, and a height d5 of the plurality of projections may be 0.5 mm or more and 0.75 mm or less, but is not limited thereto.

That is, since the radome 170 of the vehicular radar apparatus according to an embodiment of the present invention may form the projection part 175 on the inner side surface 177, radio waves transmission in a surface direction is suppressed due to irregular reflection and may increase a radio wave transmission in a vertical direction.

FIG. 4 is a plan view of a radome of a vehicular radar apparatus according to a first embodiment of the present invention.

Referring to FIG. 4, a radome 170a may include a projection part 175a disposed on an inner side surface 177a in an edge part 173a as shown in a plan view of the inner side surface 177a of the radome 170a. A distance d7 in an X-axis direction and a distance d6 in a Y-axis direction, each of which is a distance between the edge part 173a and the inner side surface 177a, may be equal, but is not limited thereto. The distance d7 of the X-axis direction between the edge part 173a and the inner side surface 177a may be 5 mm or more and 7 mm or less, and the distance d6 of the Y-axis direction between the edge part 173a and the inner side surface 177a may be 5 mm or more and 7 mm.

The projection part 175a of the radome according to the first embodiment is in a shape continuously extending in a longitudinal direction (for example, the Y-axis direction), and a plurality of projections may be disposed in a lateral direction (for example, the X-axis direction).

FIG. 5 is a plan view of a radome of a vehicular radar apparatus according to a second embodiment of the present invention. Referring to FIG. 5, a radome 170b may include a projection part 175b disposed on an inner side surface 177b in an edge part 173b as shown in a plan view of the inner side surface 177b of the radome 170b. A distance of the X-axis direction and a distance of the Y-axis direction, each of which is a distance between the edge part 173b and the inner side surface 177b, may be equal, but is not limited thereto.

The projection part 175b of the radome according to the second embodiment is in a shape discontinuously extending in a longitudinal direction (for example, the Y-axis direction), and a plurality of projections may be disposed in a zigzag shape in a lateral direction (for example, the X-axis direction).

FIG. 6 is a cross-sectional view illustrating a radome and a PCB of a vehicular radar apparatus according to a third embodiment of the present invention.

Referring to FIG. 6, a radome 170c may include a cover part 171c disposed opposite to a PCB 150, an edge part 173c configured to be fastened to a case 110, and a projection part 175c disposed on an inner side surface 177c of the cover part 171c.

The cover part 171c may accommodate the PCB 150 in order to protect the PCB 150 and may pass radio waves radiated from antenna parts 410 and 420 mounted on the PCB 150 and radio waves received from outside.

The PCB 150 may be disposed in a space formed by a height difference between the cover part 171c and the edge part 173c of the radome 170c.

A transmitting antenna part 410 and a receiving antenna part 420 may be mounted on the PCB 150. The receiving antenna part 420 may include a plurality of receiving antenna arrays 421, 423, 425, and 427.

The radome 170c according to the third embodiment may not include at least one of the plurality of projection parts 175c in an area where the cover part 171c and the antenna parts 410 and 420 are overlapped in a vertical direction. That is, since the projection part 175c is not disposed in a vertical direction of the transmitting antenna part 410 and the receiving antenna part 420, the transmission of the radio waves is increased in a vertical direction, and a beam width may be widened.

Referring to enlarged views of the radome 170c and the PCB 150, a height of the cover part 171c of the radome 170c and a height of the edge part 173c may be equal, but is not limited thereto. A distance d8 between the edge part 173c of the radome 170c and the transmitting antenna part 410 may be 10 mm or less, but is not limited thereto.

According to the third embodiment, an area overlapped in a vertical direction with an area where the cover part 171c of the radome 170c and the antenna parts 410 and 420 are disposed, for example, a width d9 of an area where the projection parts are not formed may be 1 mm or more and 2.5 mm or less, but is not limited thereto.

FIG. 7 is a plan view of a radome of a vehicular radar apparatus according to a third embodiment of the present invention.

Referring to FIG. 7, the radome 170c may include a projection part 175c disposed on an inner side surface 177c in an edge part 173c as shown in a plan view of the inner side surface 177c of the radome 170c. A distance in the X-axis direction and a distance in the Y-axis direction, each of which is a distance between the edge part 173c and the inner side surface 177c, may be equal, but is not limited thereto.

The projection part 175c of the radome according to the third embodiment is in a shape continuously extending in a longitudinal direction (for example, the Y-axis direction), and may be disposed in plural in a lateral direction (for example, the X-axis direction).

The radome 170c may not include at least one of the plurality of projection parts 175c in an area where the cover part 171c and the antenna parts 410 and 420 are overlapped in a vertical direction.

FIG. 8 is a cross-sectional view illustrating a radome and a PCB of a vehicular radar apparatus according to a fourth embodiment of the present invention.

Referring to FIG. 8, a radome 170d may include a cover part 171d disposed opposite to a PCB 150, an edge part 173d configured to be fastened to a case 110, and a projection part 175d disposed on an inner side surface 177d of the cover part 171d.

The cover part 171d may accommodate the PCB 150 in order to protect the PCB 150 and may pass radio waves radiated from antenna parts 410 and 420 mounted on the PCB 150 and radio waves received from outside.

The PCB 150 may be disposed in a space formed by a height difference between the cover part 171d and the edge part 173d of the radome 170d.

A transmitting antenna part 410 and a receiving antenna part 420 may be mounted on the PCB 150, and the receiving antenna part 420 may include a plurality of receiving antenna arrays 421, 423, 425, and 427.

The radome 170d according to the fourth embodiment may further include a plurality of projection parts 179 on an outer side surface of the radome 170d in which the cover part 171d and the antenna parts 410 and 420 are overlapped in a vertical direction. The plurality of projection parts 179 may be in a lens shape, but is not limited thereto. The radome 170d according to the fourth embodiment may include a lens-shaped projection part on an outer side surface thereof to increase a beam width.

FIG. 9 is a plan view of a radome of a vehicular radar apparatus according to a fourth embodiment of the present invention.

Referring to FIG. 9, it is a plan view of an outer side surface of a radome according to the fourth embodiment. The plurality of projection parts 179 may be disposed on a cover part 171d, and may be disposed in parallel with antenna parts 410 and 420.

FIG. 14 is a plan view of a radome of a vehicular radar apparatus according to a fifth embodiment of the present invention.

Referring to FIG. 14, a radome 170e according to the fifth embodiment may include a cover part 171e disposed opposite to a PCB 150, an edge part 173e configured to be fastened to a case 110, and a projection part 175e disposed on an inner side surface 177e of the cover part 171e.

The radome 170e according to the fifth embodiment may differ from the radome 170 in terms of a shape of a side wall between the cover part 171 and the edge part 173 according to the first embodiment shown in FIG. 3. The radome 170e according to the fifth embodiment may include a curved side wall between the cover part 171e and the edge part 173e.

FIG. 15 is a plan view of a radome of a vehicular radar apparatus according to a sixth embodiment of the present invention.

A radome 170f according to the sixth embodiment may include a cover part 171f disposed opposite to a PCB 150, an edge part 173f configured to be fastened to a case 110, and a projection part 175f disposed on an inner side surface 177f of the cover part 171f.

The radome 170f according to the sixth embodiment may differ from the radome 170c in terms of a shape of a side wall between the cover part 171c and the edge part 173c according to the third embodiment shown in FIG. 6. The radome 170f according to the sixth embodiment may include a side wall having an inclination of a predetermined angle between the cover part 171f and the edge part 173f.

FIG. 10 is a 3D radiation pattern diagram of vehicular radar apparatuses according to first and third embodiments of the present invention.

(a) of FIG. 10 is a 3D radiation pattern diagram of the vehicular radar apparatus according to the first embodiment, and (b) of FIG. 10 is a 3D radiation pattern diagram of the vehicular radar apparatus according to the third embodiment.

Referring to (a) of FIG. 10, in the vehicular radar apparatus according to the first embodiment, a peak gain at 1 dB (red outermost section) is 14.28 dB, a peak gain angle is 0 degree, a maximum left angle is −79 degrees, and a maximum right angle is 79 degrees, which explains that a beam width is secured up to 158 degrees.

Referring to (b) of FIG. 10, in the vehicular radar apparatus according to the third embodiment, a peak gain at 1 dB (red outermost section) is 14.05 dB, a peak gain angle is 1 degree, a maximum left angle is −78 degrees, and a maximum right angle is 79 degrees, which describes that a beam width is secured up to 157 degrees.

That is, according to an embodiment of the present invention, a vehicular radar apparatus including a projection on an inner side surface of a radome may be implemented with a beam width of 150 degrees or more, and, in particular, may have high efficiency as a side and rear side radar, which detects a blind spot.

FIG. 11 is a 2D radiation pattern diagram of a vehicular radar apparatus according to a first embodiment of the present invention.

Referring to FIG. 11, according to the first embodiment, a vehicular radar apparatus 100 may be configured such that a transmitting antenna part 410 is a first channel CH1 and a plurality of receiving antenna arrays 421, 423, 425, and 427 of a receiving antenna part 420 are a second channel CH2, a third channel CH3, a fourth channel CH4, and a fifth channel CH5, respectively.

According to the first embodiment, it can be seen that when the vehicular radar apparatus 100 has a gain of 3 dB, a beam width de1 of the plurality of receiving antennas is 153 degrees or more, and it describes that a beam width is 150 degrees or more. It can be recognized that such a result is shown as similar to each of the plurality of channels.

FIG. 12 is a 2D radiation pattern diagram of a vehicular radar apparatus according to an embodiment of the present invention.

Referring to FIG. 12, a solid line graph is a radiation pattern diagram of a radome without projection, a R1 graph is a radiation pattern diagram of the radome according to the first embodiment, and a R2 graph is a radiation pattern diagram of the radome according to the third embodiment.

When the radome without a projection has a gain of 3 dB, a beam width thereof is only 120 degrees, but it can be seen that the beam width corresponds to 158 degrees when the radomes according to the first embodiment and the third embodiment have a gain of 3 dB, and it can be seen that such a result is shown as similar to each of the plurality of channels.

FIG. 13 is a plan view illustrating a vehicular radar apparatus mounted on a side and rear side of a vehicle according to an embodiment of the present invention.

Referring to FIG. 13, a vehicular radar apparatus 100 may be mounted on a side and rear side of a vehicle, respectively. For example, a plurality of antenna arrays of the vehicular radar apparatus 100 may be disposed perpendicular to the X-axis direction, and radio waves may be radiated in the Z-axis direction.

As shown in the vehicular radar apparatus 100 according to an embodiment, when a wide-angle radar that provides a wide field of view (FOV) on a side and rear side of a vehicle is mounted on a side and rear side of a vehicle, it is possible to completely cover a blind spot formed at the side and rear side of the vehicle, thereby assisting safe driving.

The above detailed description should not be construed restrictively in all aspects and should be regarded as illustrative. The scope of the present invention should be determined by reasonable interpretation of the appended claims, and all changes within the equivalent scope of the present invention are included in the scope of the present invention.

The invention claimed is:

1. A radome of a radar apparatus, comprising:
a cover part configured to cover a printed circuit board (PCB) on which a plurality of antenna arrays and an integrated circuit (IC) chip connected to the plurality of antenna arrays are formed;
an edge part extending from edges of the cover part;
a projection part formed on an inner surface of the cover part, the projection part including a plurality of first projections configured to be opposite to the plurality of antenna arrays; and
a plurality of second projections on an outer side surface of the cover part,
wherein each of the plurality of second projections overlap, in a vertical direction, a respective antenna array among the plurality of antenna arrays,
wherein the projection part is spaced from the edges of the cover part by a predetermined distance,
wherein each projection extends continuously in a lateral direction from a first side of the projection part to a second side of the projection part, the first side of the projection part being opposite to the second side of the projection part in the lateral direction,
wherein the plurality of first projections are spaced at substantially same intervals between a third side of the projection part to a fourth side of the projection part in a longitudinal direction, the third side of the projection part being opposite to the fourth side of the projection part, and
wherein the inner surface of the cover part is opposite to the IC chip.

2. The radome of claim 1,
wherein the PCB is disposed in a space formed by a height difference between the edge part and the cover part.

3. The radome of claim 1, wherein the cover part does not comprise at least one of the plurality of first projections in an area overlapped in the vertical direction with an area where the antenna array is disposed.

4. The radome of claim 1, wherein an arrangement direction of the plurality of projection parts is in parallel with an arrangement direction of the antenna array.

5. The radome of claim 2, wherein a height of the cover part is equal to a height of the edge part, and the heights of the cover part and the edge part are 1 mm or more and 2 mm or less.

6. The radome of claim 1, wherein an interval of each of the plurality of first projections is 1 mm.

7. The radome of claim 1, wherein a distance between an inner side surface of the cover part and the PCB is 1 mm or more and 3 mm or less.

8. The radome of claim 1, wherein a height of the plurality of first projections is 0.5 mm or more and 0.75 mm or less.

9. The radome of claim 2, wherein a distance of an X-axis direction and a distance in a Y-axis direction, which is a distance between the edge part and the inner side surface, is equal, and the distance between the edge part and the inner side surface is 5 mm or more and 7 mm or less.

10. The radome of claim 2, wherein the plurality of antenna arrays comprise a transmitting antenna part, and a width between the transmitting antenna part and the edge part is 10 mm.

11. The radome of claim 1, wherein a width of an area that does not include at least one of the plurality of first projections in an area overlapped in the vertical direction with an area where the antenna array is disposed is 1 mm or more and 2.5 mm or less.

12. The radome of claim 1, wherein the plurality of first projections are disposed to a ground in the vertical direction.

13. A vehicular radar apparatus, comprising:
a case;
a PCB which is accommodated in the case and in which a plurality of antenna arrays and an IC chip connected to the plurality of antenna arrays are disposed; and
a radome coupled to the case,
wherein the radome comprises:
a cover part configured to cover the PCB;
an edge part extending from edges of the cover part; and a projection part formed on an inner surface of the cover part, the projection part including a plurality of first projections opposite to the plurality of antenna arrays, wherein the projection part is spaced from the edges of the cover part by a predetermined distance, wherein each projection extends continuously in a lateral direction from a first side of the projection part to a second side of the projection part, the first side of the projection part being opposite to the second side of the projection part in the lateral direction, wherein the plurality of first projections are spaced at substantially same intervals between a third side of the projection part to a fourth side of the projection part in a longitudinal direction, the third side of the projection part being opposite to the fourth side of the projection part, wherein the vehicular radar apparatus further comprises a plurality of second projections on an outer side surface of the cover part, and wherein each of the plurality of second projections overlap, in a vertical direction, a respective antenna array among the plurality of antenna arrays.

14. The vehicular radar apparatus of claim 13, wherein the inner surface of the cover part faces the IC chip, and wherein the PCB is disposed in a space formed by a height difference between the edge part and the cover part.

15. The vehicular radar apparatus of claim 13, wherein the cover part does not comprise at least one of the plurality of first projections in an area overlapped in the vertical direction with an area where the antenna array is disposed.

16. The vehicular radar apparatus of claim 13, further comprising:

a shield part disposed between the PCB and the radome and configured to shield a radio frequency (RF) signal generated from the PCB.

17. The vehicular radar apparatus of claim 16, wherein the shield part is overlapped in the vertical direction with an area where the IC is disposed.

18. The radome of claim 1, wherein the inner surface of the cover part is directly opposite to the IC chip.

* * * * *